United States Patent
Sahay et al.

(10) Patent No.: US 10,841,723 B2
(45) Date of Patent: Nov. 17, 2020

(54) DYNAMIC SWEET SPOT CALIBRATION

(71) Applicant: Harman International Industries, Incorporated, Stamford, CT (US)

(72) Inventors: Pratyush Sahay, Bangalore (IN); Srinivas Kruthiventi Subrahmanyeswara Sai, Bangalore (IN); Arindam Dasgupta, Kolkata (IN); Pranjal Chakraborty, Bangalore (IN); Debojyoti Majumder, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 98 days.

(21) Appl. No.: 16/025,986

(22) Filed: Jul. 2, 2018

(65) Prior Publication Data
US 2020/0008002 A1    Jan. 2, 2020

(51) Int. Cl.
*H04S 7/00* (2006.01)
*G06K 9/00* (2006.01)
*G06K 9/62* (2006.01)
*G06N 3/04* (2006.01)

(52) U.S. Cl.
CPC .......... *H04S 7/303* (2013.01); *G06K 9/00369* (2013.01); *G06K 9/00624* (2013.01); *G06K 9/6262* (2013.01); *G06N 3/04* (2013.01)

(58) Field of Classification Search
CPC ................ H04S 7/303; G06K 9/00369; G06K 9/00624; G06K 9/6262; G06N 3/04
See application file for complete search history.

(56) References Cited

U.S. PATENT DOCUMENTS

| | | | |
|---|---|---|---|
| 8,932,134 B2 * | 1/2015 | Andall | A63F 13/54 381/300 |
| 9,965,701 B2 | 5/2018 | Lee et al. | |
| 10,019,654 B1 * | 7/2018 | Pisoni | G06K 9/3241 |
| 2013/0336579 A1 * | 12/2013 | Rashad Mohamed | G06K 9/6256 382/159 |
| 2014/0072170 A1 * | 3/2014 | Zhang | G06K 9/00369 382/103 |
| 2018/0060025 A1 | 3/2018 | Hill et al. | |
| 2018/0063664 A1 | 3/2018 | Horbach et al. | |

(Continued)

FOREIGN PATENT DOCUMENTS

GB    2 457 508 A    8/2009

OTHER PUBLICATIONS

Ryan Tan, Video Analytics for Indoor Crowd Estimation, Jul. 1, 2018, 2018 IEEE International Conference on Service Operations and Logistics, and Infomatics, p. 21-25. (Year: 2018).*

(Continued)

*Primary Examiner* — Brenda C Bernardi
(74) *Attorney, Agent, or Firm* — Artegis Law Group, LLP (57) ABSTRACT

A technique for dynamic sweet spot calibration. The technique includes receiving an image of a listening environment, which may have been captured under poor lighting conditions, and generating a crowd-density map based on the image. The technique further includes setting at least one audio parameter associated with an audio system based on the crowd-density map. At least one audio output signal may be generated based on the at least one audio parameter.

17 Claims, 5 Drawing Sheets

(56) References Cited

U.S. PATENT DOCUMENTS

2018/0063665 A1    3/2018  Walker et al.
2019/0377980 A1*  12/2019  Connell ............ G06K 9/00624

OTHER PUBLICATIONS

Extended European Search report for application No. 19183433.2 dated Aug. 13, 2019.
Tripathi et al., "Convolutional neural networks for crowd behaviour analysis: a survey", Visual Computer, Springer, https://doi.org/10.1007/s00371-018-1499-5, vol. 35, No. 5, Mar. 26, 2018, pp. 753-776.

* cited by examiner

DYNAMIC SWEET SPOT CALIBRATION

BACKGROUND

Field of the Embodiments

The various embodiments relate generally to audio signal processing and, more specifically, to techniques for dynamic sweet spot calibration.

Description of the Related Art

While listening to audio, the quality of sound generally depends on the relative position of a listener and the speakers. For example, in a two-speaker stereo system, the ideal position, known as the "sweet spot," is generally any position approximately equidistant from the two speakers. "Sweet spot" is a term used to describe the focal point between two or more speakers of an audio system, where an individual may be capable of hearing a stereo audio mix as designers of the system intended. For a relatively large area (e.g., cinema halls, concert halls, etc.), the sweet spot is typically at a central location where the sound perceived by the audience is at its best. Audience members that are in locations outside of the sweet spot may experience sound quality that is relatively poor as compared to the sound quality at the sweet spot.

The size and shape of the sweet spot generally depends on any of a number of parameters such as environment (e.g., room) acoustics, size of the room, and sound source attributes, just to name a few examples. In general, sound mixing engineers may consider location and distribution of an audience when setting or modifying audio parameters of a mixing console in order to generate a sweet spot at a location that is proximate to the maximum number of people.

In some circumstances, open or closed venues, such as arenas, concert halls, theatres, and the like have preinstalled sound systems which are calibrated only during installation of the sound system. Such calibration may be designed to generate a sweet spot at a default location, typically a central area, of the venue. At times, however, venues may only be partially filled or the audience may be concentrated in an area away from than the sweet spot of the venue. In such cases, the sound system is providing the "best" sound experience to only a relatively small portion of the audience (e.g., the "best" sound may be provided to empty seats in the venue).

As the foregoing illustrates, improved techniques for calibrating an audio system to adjust the location of the sweet spot would be useful.

SUMMARY

One embodiment of the disclosure sets forth a computer-implemented method for dynamic sweet spot calibration. The method includes receiving an image of a listening environment; generating a crowd-density map based on the image; and setting at least one audio parameter associated with an audio system based on the crowd-density map, wherein at least one audio output signal is generated based on the at least one audio parameter.

Further embodiments provide, among other things, a system and a non-transitory computer-readable medium configured to implement the method set forth above.

Advantageously, the disclosed techniques and system architectures enable a sweet spot to be automatically generated at a location that is based on audience distribution. Moreover, the location of the sweet spot may be updated dynamically, in response to changes in the audience distribution.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

While listening to audio, the quality of sound depends on the relative position of the listener and the speakers. In a two-speaker system, the ideal position for the listener, known as the "sweet spot," is generally any position approximately equidistant from the two speakers. The concept of a sweet spot also applies to methods of delivering audio content using more than two speakers such as, for example, when speaker arrays are used in two-channel audio. Further, the concept of a sweet spot also applies to multichannel audio content with more than two channels (e.g., various surround sound systems).

When available at a venue during a performance, professional mixing engineers typically observe the audience and try to update audio settings in a sound mixing console to generate a sweet spot so that a maximum number of audience members are able to experience the "best" audio. In some situations, however, such as in closed venues like arenas, halls, and theatres, a sound system may be preinstalled or pre-designed by a sound engineer, where the audio settings are calibrated only during installation of the sound system. In these situations, a default location of the sweet spot is usually at the center area of the venue.

There are many times that venues are only partially filled or the audience is concentrated in a portion of the venue other than the center. In these situations, the best sound may be experienced by a relatively small portion of the audience.

Embodiments herein present techniques for providing the sweet spot of a sound system in a venue to a relatively large portion of an audience by dynamically determining where to place the sweet spot. In various embodiments, the determination may involve a deep learning-based solution that performs a dual task of image quality improvement/enhancement and crowd density estimation, as described below.

System Overview

Figure 1:
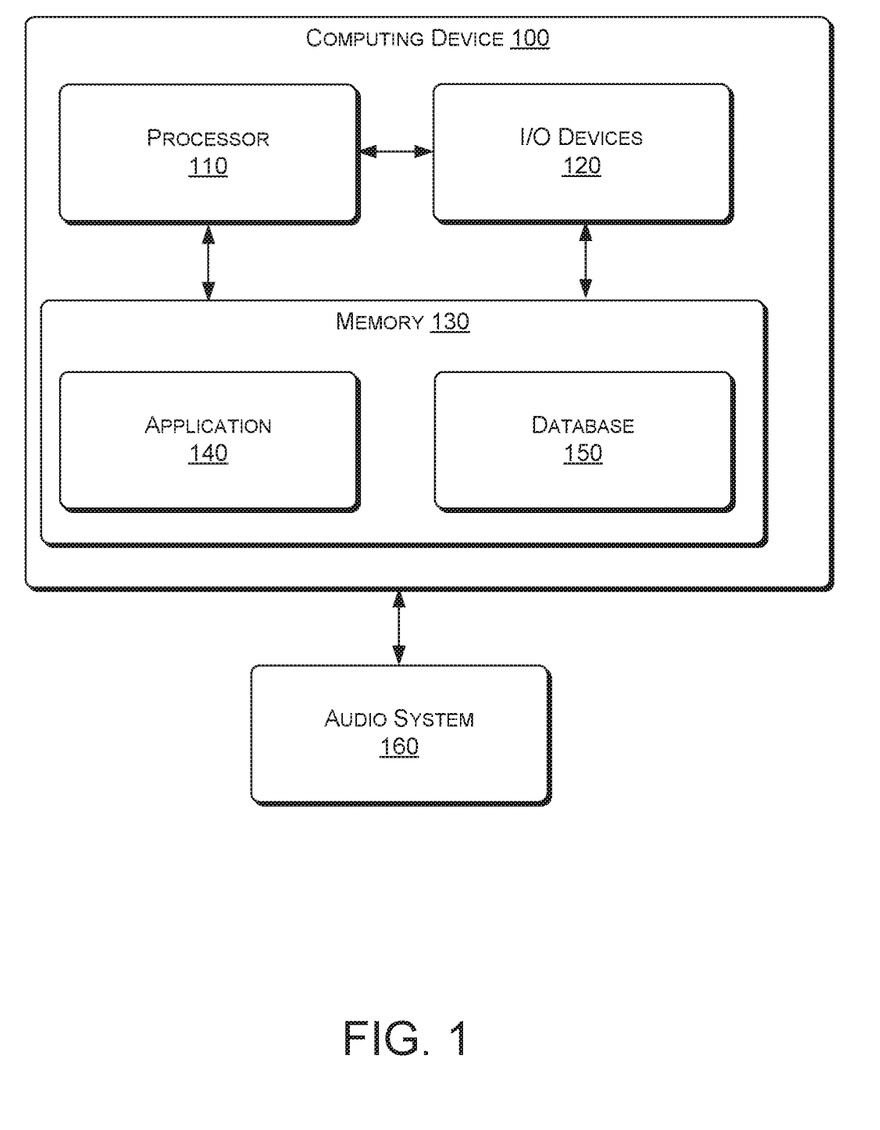
FIG. 1 illustrates a computing device configured to implement one or more aspects of an audio system, according to various embodiments.

FIG. 1 illustrates a computing device 100 configured to implement one or more aspects of an audio system, according to various embodiments described below, for example. As illustrated, computing device 100 includes a processor 110, input/output (I/O) devices 120, and a memory 130. Memory 130 includes a deep learning-based crowd density estimation application 140 configured to interact with a database 150 of image data, for example. Computing device 100 may be electrically connected (e.g., wirelessly or wired) to an audio system 160.

Processor 110 may be any technically feasible form of processing device configured to process data to generate output, such as by executing program code. Processor 110 could be, for example, and without limitation, a central processing unit (CPU), a graphics processing unit (GPU), an application-specific integrated circuit (ASIC), a field-programmable gate array (FPGA), an analog signal processor (ASP) (e.g., an analog noise cancellation circuit), and so forth.

Memory 130 may include a memory module or a collection of memory modules. Deep learning-based crowd density estimation application 140 within memory 130 may be executed by processor 110 to implement the overall functionality of computing device 100. For example, and without limitation, processor 110 may retrieve from database 150 an image of a listening environment, generate a crowd-density map based, at least in part, on the image, and determine the one or more audio parameters based, at least in part, on the crowd-density map.

I/O devices 120 may include input devices, output devices, and devices capable of both receiving input and providing output. For example, and without limitation, I/O devices 120 could include wired and/or wireless communication devices that send information from processor 110 to audio system 160 and/or multiple speakers 120.

Memory 130 may include one or more databases 150. For example, and without limitation, database(s) 150 can store captured images of venues in various lightning and/or crowd-density conditions, listening environment (e.g., a venue) attributes (e.g., location data, frequency response, history of sweet spot location, and so on), speaker attributes, and other types of acoustic data, as described below. This database helps in providing the data for pre-training and periodic fine-tuning of the deep learning-based crowd density estimation application 140.

Figure 2A:
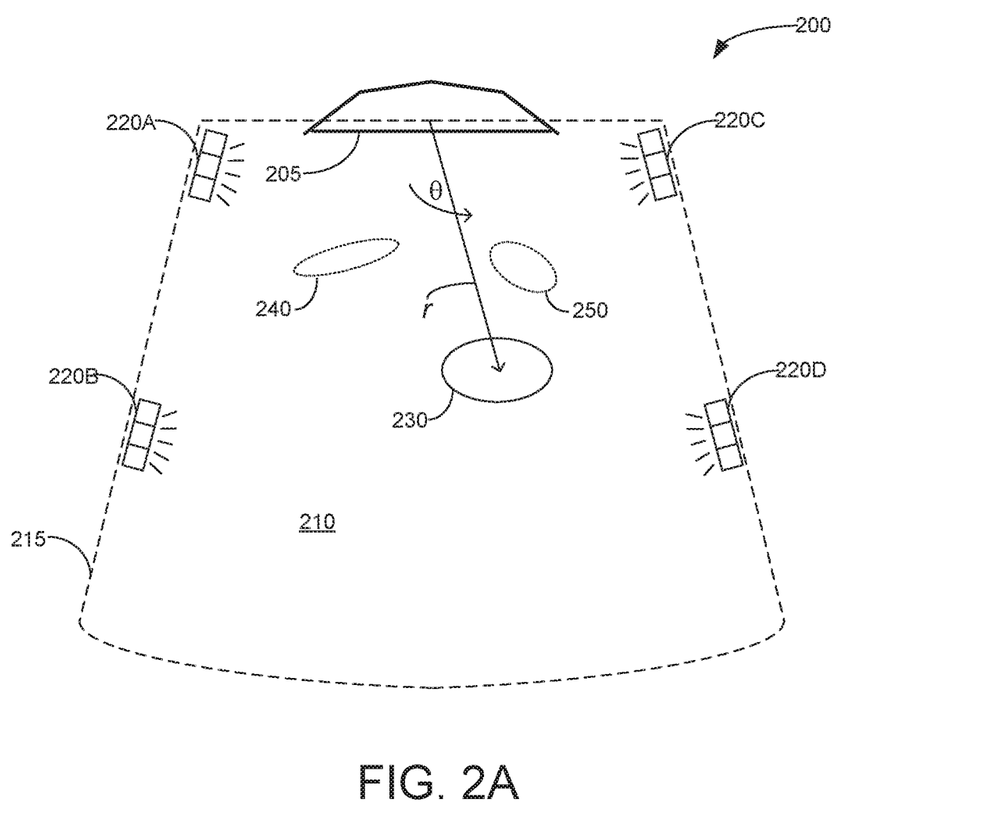
FIGS. 2A and 2B include schematic top and side views of a venue including a stage and a sound system, according to various embodiments.
Figure 2B:
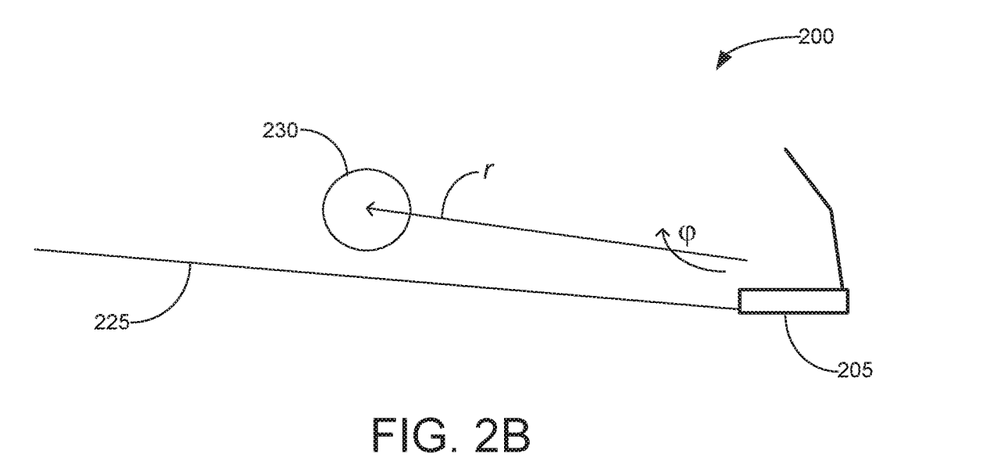

FIGS. 2A and 2B include a schematic top view and side view, respectively, of a venue 200 including a stage 205 and a sound system, according to various embodiments. Venue 200 may be fully or partially indoors (e.g., enclosed) or outdoors, may be of any size, and may be an arena, a stadium, or a theatre, just to name a few examples. Venue 200 comprises a listening area 210 (e.g., a seating and/or standing area) generally within a perimeter 215. An audience may gather anywhere in listening area 210 to, for example, view and listen to a performance on stage 205. Audio may be provided to the audience via one or more speakers 220, a few of which are illustrated in FIG. 2. Speakers 220, or any portion thereof, may be located on or proximate to walls, posts, floor stands or floor 225 (e.g., or ground), and/or a ceiling, if such structures exist, of listening area 210. The audio may be generated and controlled by audio system 160, illustrated in FIG. 1, that may be electronically connected, wired or wirelessly, to speakers 220. Moreover, audio system 160 may electrically communicate with, and/or be controlled by, a computing device, such as 100 illustrated in FIG. 1.

Audio system 160 may generate, via speakers 220, a sound field having a sweet spot in a particular location of listening area 210. A region 230 in FIG. 2 is illustrated as an example of a possible location of such a sweet spot. Generally, the size, shape, and location of the sweet spot is a function of a combination of variables and audio parameters, such as the structure and design (e.g., dimensions, materials, and so on) of venue 200, relative audio power and phase of the respective audio signals produced by each of speakers 220, relative locations of each of speakers 220 with respect to one another and to venue 200, and so on. Accordingly, audio system 160 may generate a sound field to have a sweet spot in any of a number of locations of listening area 210 by operating with a particular set of audio parameters within constraints presented by a combination of physical variables set forth by venue 200. Such audio parameters may be provided by computing device 100, for example.

An audience of venue 200 generally comprises an inhomogeneous distribution of people in listening area 210. In various embodiments, such a distribution may be expressed as crowd-density, which is a variable that describes the number of people per unit area. For example, an area 240 may encompass an audience having a first (average) crowd-density, and an area 250 may encompass an audience having a second (average) crowd-density. Crowd-density of the audience may vary over the listening area 210. For example, typically a central region of listening area 210 has a relatively high crowd-density while corner regions of listening area 210 have relatively low crowd-densities. In such cases, a sweet spot located in the central region will most likely be experienced by a relatively large number of the audience.

In some situations, however, crowd-density may be highest in areas other than the central portion of listening area 210. For example, certain types of performances or events on stage 205 may encourage the audience to favor one side versus the other side of listening area 210. In such cases, a sweet spot located in the central region will most likely be experienced by relatively few members of the audience.

In various embodiments, location in listening area 210 may be described by a spherical coordinate system, though claimed subject matter is not limited in this respect. For example, the location of the sweet spot in region 230 may be at least partially identified by a world coordinate system comprising the variables r, θ, and φ, wherein r is defined as the length (e.g., corresponding to a distance) of a vector extending from a central point of stage 205 to the location of the sweet spot (or any other location for which a location is to be identified). The coordinate θ, is defined as an angle of rotation of the vector in a horizontal plane, and the coordinate φ is defined as an angle of rotation of the vector in a vertical plane.

Figure 3:
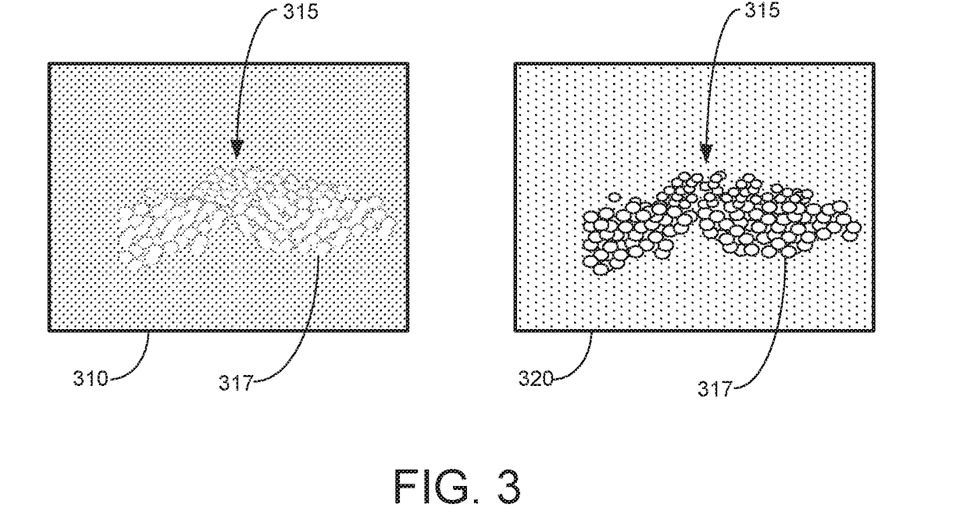
FIG. 3 illustrates captured images of an audience in a venue illuminated by different levels of light, according to various embodiments.

FIG. 3 illustrates captured images of an audience in a venue illuminated by different levels of light, according to various embodiments. For example, image 310 is an image of an audience 315 captured at a particular time during an event at a venue, such as 200 illustrated in FIG. 2. Audience 315 comprises individual persons 317 that are located relative to one another in a fashion that leads to a crowd-density distribution. For example, if a large number of persons 317 are located in a relatively small area of a venue, then the crowd-density of that area of the venue is relatively high. Accordingly, a count of persons in areas of a venue may lead to a determination of crowd-density. Such a count may be performed using images of the audience in the venue. In particular, various portions of such images correspond to various areas of the venue. Thus, a count of individual persons 317 in the various portions of the images may allow for a determination of crowd-density of the various areas of the venue.

Success or accuracy of counts of individual persons 317 in various portions of images generally depend, at least in part, on quality of the images. Illumination of the audience is particularly important. Image 320 is an image of audience 315 captured at another particular time. The image of audience 315 in image 310 is obscured due to poor light conditions (e.g., relatively low light levels illuminating the audience). The image of audience 315 in image 320, on the other hand, is not obscured thanks to relatively high light levels illuminating the audience. As described below, computing device 100 may perform a number of processes to allow for determining crowd-density by analyzing the audience captured in an image. Such processes may involve, for example, image enhancement and deep learning by a convolutional neural network which, in some embodiments, may be a fully convolutional neural network.

Figure 4:
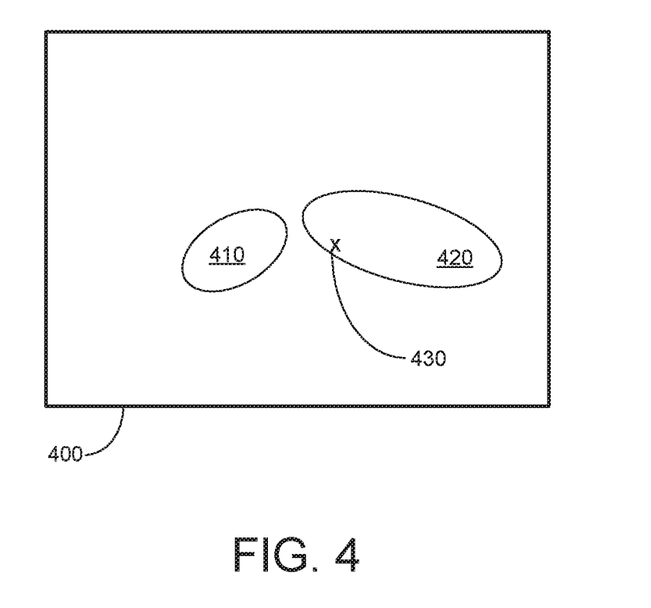
FIG. 4 is a schematic diagram of a crowd-density heat map of the audience illustrated in FIG. 3, according to various embodiments.

FIG. 4 is a schematic diagram of a crowd-density heat map 400 of audience 315 illustrated in FIG. 3, according to various embodiments. Heat map 400 is a graphical representation of the crowd-density represented as colors or contour lines. For example, heat map 400 in FIG. 4 illustrates a first region 410 and a second region 420, each representing a particular crowd-density value (or range of crowd-density values) corresponding to the crowd-density of audience 315. In some implementation, as described below, a centroid (or center of "mass") 430 of crowd-density heat map 400 may be determined and considered to be a desirable location for a sweet spot because such a location tends toward a substantial maximum number of persons that can experience favorable sound conditions of the sweet spot.

Figure 5:
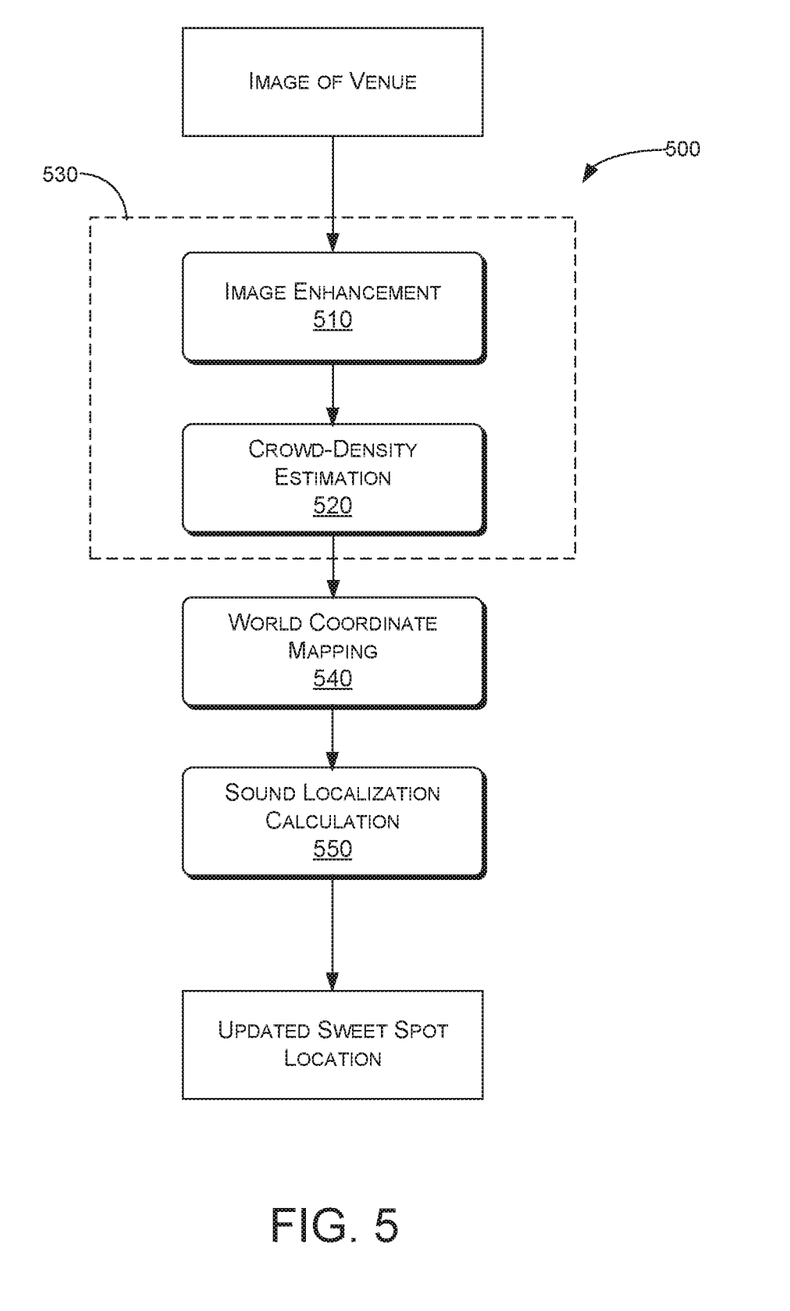
FIG. 5 is a flow diagram for dynamically determining a location for a sweet spot based on crowd density, according to various embodiments.

FIG. 5 is a flow diagram of a process 500 of dynamically determining a location (e.g., a target location) for a sweet spot in a venue based on crowd density, according to various embodiments. Process 500 may be performed in a number of functional blocks, each executed by a processor (or one or more processors), such as computing device 100 illustrated in FIG. 1, as described below. Although process steps are described in conjunction with processor 110 of computing device 100 of FIG. 1, persons skilled in the art will understand that any system configured to implement the process steps, in any order, falls within the scope of the disclosure Image enhancement block 510 and crowd-density estimation block 520 are included in a deep learning-based crowd estimation (DLCE) system 530, which is a type of Deep Neural Network. Image enhancement block 510 may be a fully convolutional neural network (FCNN) that is pre-trained with images of at least a portion of the venue. Such pre-training may be performed using pairs of images, each pair including an image of a poorly-lit scene of the venue and an image of the same scene that is well-lit. For example, images of a scene may be captured twice while controlling shutter speed of a camera (e.g., long exposure and short exposure). At the image enhancement block 510, processor 110 can process an image of the venue to produce a photographically enhanced version of the input image. For example, any of a number of types of image-enhancing processes may be used at block 510.

The photographically enhanced version of the image is subsequently provided to processor 110 at crowd-density estimation block 520, which is also included in the FCNN. At the crowd-density estimation block 520, processor 110 may train a neural network to process an image of an audience to determine the crowd-density (e.g., number of people per area) for regions visible in the image. During training, earlier convolutional layers can learn to extract primitive image features such as object edges, object corners, and so on while later convolutional layers can learn to hierarchically combine the primitive features to build a more abstract semantic understanding of the image, such as shapes of faces, shoulders, and so on. Accordingly, at the crowd-density estimation block 520, processor 110 may produce a crowd-density heat map, such as 400 illustrated in FIG. 4.

At the world coordinate mapping block 540, processor 110 may perform any of a number of analytical functions on the crowd-density heat map. For example, processor 110 may compute the centroid or other parameters of density distribution of the audience. In some embodiments, the centroid or other parameters may be expressed in image coordinates, which expresses, for example, density of people per pixel (or cluster of pixels). In this fashion, processor 110 may determine a pixel, and corresponding location of the venue, for which there is a maximum density of people in the image. At the world coordinate mapping block 540, processor 110 may convert the pixel coordinates (which are based on the image) to world coordinates, which are based on the venue. As described above (e.g., FIGS. 2A and 2B), world coordinates may be expressed as a spherical coordinate system comprising the variables r, θ, and φ, wherein r is defined as the length (e.g., corresponding to a distance) of a vector extending from a central point of stage 205 to the location of the sweet spot (or any other location for which a location is to be identified). The coordinate θ is defined as an angle of rotation of the vector in a horizontal plane, and the coordinate φ is defined as an angle of rotation of the vector in a vertical plane. Any other type of coordinate system (and origin thereof) may be used, and claimed subject matter is not limited in this respect.

At the sound localization calculation block 550, processor 110 uses the real world coordinates to update the previous location of the sweet spot. Processor 110 may dynamically adjust the location of the sweet spot by calculating the updated location of the sweet spot based, at least in part, on a recent determination of crowd density and the following transfer functions:

$$H_L=H_L(r,\theta,\varphi,\omega,\alpha)=P_L(r,\theta,\varphi,\omega,\alpha)/P_0(r,\omega) \qquad \text{Equation 1}$$

$$H_R=H_R(r,\theta,\varphi,\omega,\alpha)=P_R(r,\theta,\varphi,\omega,\alpha)/P_0(r,\omega) \qquad \text{Equation 2}$$

The transfer function $H_L$ of Equation 1 relates sound intensity to the phase of the left side of a stereo audio source signal and the transfer function $H_R$ of Equation 2 relates sound intensity to the phase of the right side of the stereo audio source signal. The coordinates (r, θ, φ) are used to describe the angular position of the audience where r, determined at the world coordinate mapping block 540, is the distance from the stage. The variables ω and α are the angular velocity and the phase of the audio source signal, respectively. $P_L$ and $P_R$ are the audio signal powers of the left side and right side of the audio signal. $t_l$ and $t_r$ represent the original time delay for the audio signal for the left and right channels, respectively. $t_L$ and $t_R$, on the other hand, represent the adjusted time delay offset introduced by the system to change the position of the "sweet spot". $P_O$ is calculated by transforming r into time variables and calculating $t_L$ and $t_R$ to determine how much time is required for sound to travel a distance r to the left-most and right-most sides of the arena, of the given coordinates in the following equations:

$$P_{LL}=L\ \exp(j\omega^*(t_l+t_L)/2) \quad \text{Equation 3}$$

$$P_{RL}=R\ \exp(-j\omega^*(t_l+t_R)/2) \quad \text{Equation 4}$$

Accordingly, $P_O$ may be written as $$P_O(r,\omega)=c^*P(t,\omega)=c^*(P(t,\omega)_l+P(t,\omega)_r) \quad \text{Equation 5}$$

where c is the speed of sound. The audio power of the left side of the stereo audio signal may be written as $$P(t,\omega)_l=P_{LL}+P_{RL}, \quad \text{Equation 6}$$

which may be expanded as $$P(t,\omega)_l=L^*\cos(j\omega^*(t_l+t_L)/2)+j^*L^*\sin(j\omega^*(t_l+t_L)/2)+ \\ R^*\cos(j\omega^*(t_l+t_L)/2)-j^*R^*\sin(j\omega^*(t_l+t_L)/2) \quad \text{Equation 7}$$

Similar to Equation 6, the audio power of the right side of the stereo audio signal may be written as $$P(t,\omega)_r=P_{LR}+P_{RR}, \quad \text{Equation 8}$$

which may be expanded as $$P(t,\omega)_r=L^*\cos(j\omega^*(t_r+t_R)/2)+j^*L^*\sin(j\omega^*(t_r+t_R)/2)+ \\ R^*\cos(j\omega^*(t_r+t_R)/2)-j^*R^*\sin(j\omega^*(t_r+t_R)/2) \quad \text{Equation 9}$$

Though the above process is described for a stereo system, the process may be extended for 5.1, 7.1, and 11.1 systems.

Figure 6:
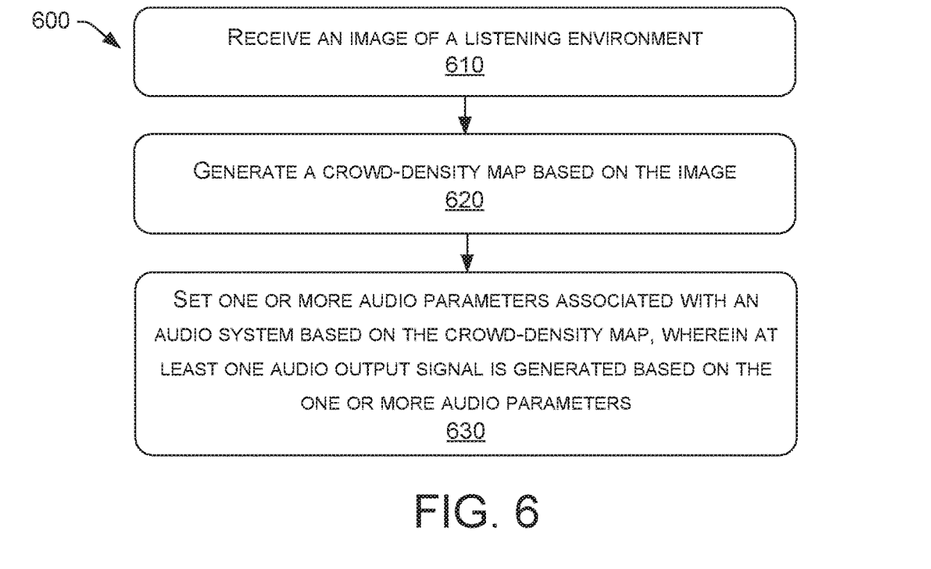
FIG. 6 is a flow diagram of method steps for determining audio parameters for producing a sweet spot at a desired location, according to various embodiments.

FIG. 6 is a flow diagram of method steps for determining audio parameters for producing a sweet spot at a desired location, according to various embodiments. Although process steps are described in conjunction with the computing device 100 of FIG. 1 and process 500 of FIG. 5, persons skilled in the art will understand that any system configured to implement the process steps, in any order, falls within the scope of the disclosure. In some embodiments, method 600 may be implemented to determine audio parameters for producing an updated sweet spot at a location determined by processor 110 at sound localization calculation block 550 shown in FIG. 5.

At step 610, processor 110 receives an image of a listening environment. For example, the image may be of an audience captured at a particular time during an event at a venue. As described above, processor 110 in image enhancement block 510 can process the image of the venue to produce a photographically enhanced version of the image.

At step 620, processor 110 generates a crowd-density map (e.g., a heat map) based on the image. For example, processor 110 at crowd-density estimation block 520 may be trained to process the image to determine the crowd-density (e.g., number of people per area) for regions visible in the image. Accordingly, processor 110 may produce a crowd-density map, such as 400 illustrated in FIG. 4.

At step 630, processor 110 sets one or more audio parameters associated with audio system 160 based on the crowd-density map. Processor 110 may determine such values using equations similar to or the same as Equations 1-9 described above, for example. The audio parameters have values that configure audio system 160 to produce a sweet spot at a target location in the venue. For example, the target location may be the updated sweet spot location provided by processor 110 in process 500. Audio system 160 may generate at least one audio output signal (e.g., to speakers 220) based on the one or more audio parameters.

Figure 7:
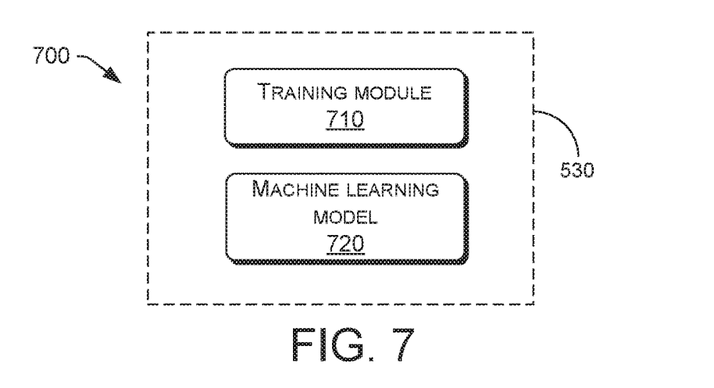
FIG. 7 is a block diagram of a machine learning system for performing the technique illustrated in FIG. 5, according to various embodiments.

FIG. 7 is a block diagram of a machine learning system 700, according to various embodiments. Machine learning system 700 may include one or more machine learning or deep learning algorithms. In various embodiments, machine learning system 700 includes a training module 710 and a machine learning model 720 in the DLCE system 530, described above. DLCE system 530 may access one or more databases that include, among other things, captured images of venues in various lightning and/or crowd-density conditions. Training data can include data from a large number of such images in a database.

Figure 8:
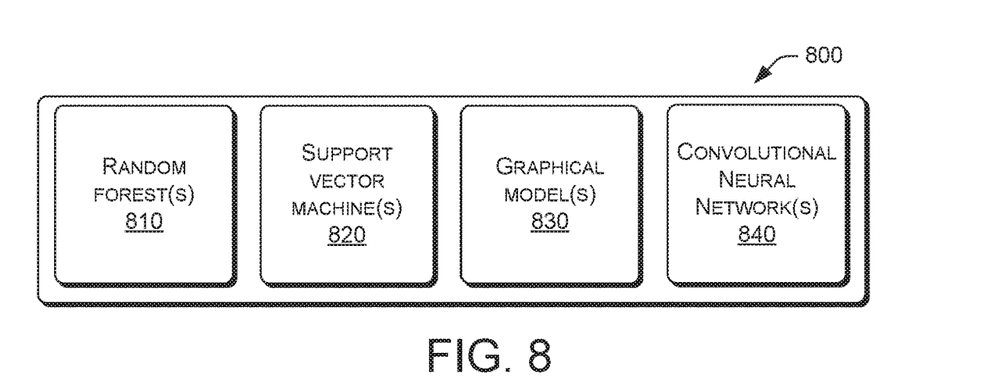
FIG. 8 is a block diagram of a machine learning model for performing the technique illustrated in FIG. 5, according to various embodiments.

FIG. 8 is a block diagram of a machine learning model 800, according to various examples. Machine learning model 800 may be the same as or similar to machine learning system 700 illustrated in FIG. 7. Machine learning model 800 includes any of a number of functional blocks, such as random forest block 810, support vector machine block 820, graphical models block 830, and convolutional neural network block 840, which may be applied to a deep neural network model such as DLCE system 530, for example. Random forest block 810 can include an ensemble learning method for classification that operates by constructing decision trees at training time, such as for training using images of venues (e.g., with and without an audience and in various lighting conditions). Random forest block 810 can output the class that is the mode of the classes output by individual trees, for example. Random forest block 810 can function as a framework including several interchangeable parts that can be mixed and matched to create a large number of particular models. Constructing a machine learning model in such a framework involves determining directions of decisions used in each node, determining types of predictors to use in each leaf, determining splitting objectives to optimize in each node, determining methods for injecting randomness into the trees, and so on.

Support vector machine block 820 classifies data for machine learning model 800. Support vector machine block 820 can function as a supervised learning model with associated learning algorithms that analyze data and recognize patterns in images, used for classification and regression analysis. For example, given a set of training data, each marked as belonging to one of two categories, a support vector machine training algorithm builds a machine learning model that assigns new training data into one category or the other.

Graphical models block 830 functions as a probabilistic model for which a graph denotes conditional dependence structures between random variables. Graphical models provide algorithms for discovering and analyzing structure in distributions and extract unstructured information. Applications of graphical models include information and/or image extraction from images, image object recognition, and computer vision, just to name a few examples.

Convolutional neural network block 840 functions as an operator for analyzing visual imagery for image enhancement and deep learning. For example, convolutional neural network block 840 may be used with image enhancement block 510 for pre-training images of venues. Convolutional neural network block 840 may be used to process an image of an audience to determine the crowd-density for regions visible in an image and can learn to extract primitive image features such as object edges, object corners, and so on. Convolutional neural network block 840 may be any type of neural network or machine learning algorithm.

In sum, various embodiments set forth techniques and system architectures that allow for a sound system of a venue to dynamically determine audio parameters that produce a sweet spot at a location that depends on the distribution of the audience in the venue. Some techniques include receiving an image of a listening environment and generating a crowd-density map based on the image. The techniques further include setting one or more audio parameters associated with an audio system based on the crowd-density map. At least one audio output signal may be generated based on the one or more audio parameters.

At least one advantage and technological improvement of the disclosed techniques is that a sweet spot can be produced at a location that is based on audience distribution. In addition, the location of the sweet spot may be changed in real-time, in response to changes in the audience distribution.

1. In some embodiments, a method comprises receiving an image of a listening environment; generating a crowd-density map based on the image; and setting at least one audio parameter associated with an audio system based on the crowd-density map, wherein at least one audio output signal is generated based on the at least one audio parameter.

2. The method of clause 1, wherein setting the at least one audio parameter comprises: determining a target location in the listening environment based on the crowd-density map; determining values for the at least one audio parameter to configure the audio system to produce a sweet spot at the target location; and setting the at least one audio parameter based, at least in part, on the values.

3. The method of any of clauses 1-2, wherein the location for the sweet spot corresponds to a centroid of the crowd-density map.

4. The method of any of clauses 1-3, further comprising enhancing the image of the listening environment via a convolutional neural network to generate an enhanced image, wherein the convolutional neural network is trained with (i) a first training image of the listening environment illuminated by a first level of light and (ii) a second training image of the listening environment illuminated by a second level of light greater than the first level of light.

5. The method of any of clauses 1-4, wherein generating the crowd-density map further comprises: detecting, via at least one machine learning algorithm, at least one physical feature of individual persons included in the image of the listening environment; determining a crowd density based, at least in part, on the physical features of the individual persons; and generating the crowd-density map using the crowd density.

6. The method of any of clauses 1-5, wherein the at least one audio parameter comprises at least one of phase and power of a signal of the audio output.

7. The method of any of clauses 1-6, further comprising dynamically modifying the at least one audio parameter in response to a change in the crowd-density map.

8. The method of any of clauses 1-7, wherein determining the location for the sweet spot in the listening environment further comprises converting pixel locations in the crowd-density map to a real-world coordinate system based, at least in part, on physical dimensions of the listening environment.

9. In some embodiments, a system comprises: a memory storing an application; and a processor that is coupled to the memory and, when executing the application, is configured to: receive an image of a listening environment; generate a crowd-density map based, at least in part, on the image; and set at least one audio parameter associated with the system based, at least in part, on the crowd-density map.

10. The system of clause 9, wherein the processor is further configured to: determine a sweet spot location in the listening environment based, at least in part, on the crowd-density map; determine at least one value for the at least one audio parameter to configure the audio system to produce a sweet spot at the sweet spot location; and set the at least one audio parameter based, at least in part, on the at least one value.

11. The system of any of clauses 9-10, wherein the processor is further configured to enhance the image of the listening environment via a convolutional neural network to generate an enhanced image, wherein the convolutional neural network is trained with (i) a first training image of the listening environment illuminated by a first level of light and (ii) a second training image of the listening environment illuminated by a second level of light greater than the first level of light.

12. The system of any of clauses 9-11, wherein the processor is further configured to dynamically modify in real-time the at least one audio parameter in response to a change in the crowd-density map.

13. The system of any of clauses 9-12, wherein the crowd-density map comprises a heat map.

14. In some embodiments, a non-transitory computer-readable storage medium including instructions that, when executed by a processor, causes the processor to perform the steps of: receiving an image of a listening environment; generating a crowd-density map based, at least in part, on the image; determining a location of a centroid or other substantially central distribution of the crowd-density map, wherein the location is with respect to the listening environment; and determining at least one audio parameter based, at least in part, on the location.

15. The non-transitory computer-readable storage medium of clause 14, wherein the instructions, when executed by the processor, further cause the processor to perform the step of transmitting the at least one audio parameter to an audio system.

16. The non-transitory computer-readable storage medium of any of clauses 14-15, wherein the instructions, when executed by the processor, further cause the processor to perform the step of determining at least one value for the at least one audio parameter to configure the audio system to produce a sweet spot at the location.

17. The non-transitory computer-readable storage medium of any of clauses 14-16, wherein the instructions, when executed by the processor, further cause the processor to perform the step of enhancing the image of the listening environment to generate an enhanced image via a convolutional neural network, wherein the convolutional neural network is trained with (i) a first training image of the listening environment illuminated by a first level of light and (ii) a second training image of the listening environment illuminated by a second level of light greater than the first level of light.

18. The non-transitory computer-readable storage medium of any of clauses 14-17, wherein the processor is further configured to dynamically modify in real-time the at least one audio parameter in response to a change in the crowd-density map.

19. The non-transitory computer-readable storage medium of any of clauses 14-18, wherein the crowd-density map is generated via a neural network.

20. The non-transitory computer-readable storage medium of any of clauses 14-19, wherein the neural network is trained based on a plurality of training images that include to a plurality of different listening environments, a plurality of different crowd densities, and a plurality of different lighting conditions.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
receiving an image of a listening environment;
enhancing the image of the listening environment based on a plurality of training images of the listening environment that includes a plurality of different lighting conditions to generate an enhanced image;
generating a crowd-density map based on the enhanced image; and
setting at least one audio parameter associated with an audio system based on the crowd-density map, wherein at least one audio output signal is generated based on the at least one audio parameter,
wherein:
enhancing the image of the listening environment comprises enhancing the image of the listening environment via a convolutional neural network,
the convolutional neural network is trained with the plurality of training images, and
the plurality of training images comprises (i) a first training image of the listening environment illuminated by a first level of light, and (ii) a second training image of the listening environment illuminated by a second level of light greater than the first level of light.

2. The method of claim 1, wherein setting the at least one audio parameter comprises:
determining a target location in the listening environment based on the crowd-density map;
determining values for the at least one audio parameter to configure the audio system to produce a sweet spot at the target location; and
setting the at least one audio parameter based, at least in part, on the values.

3. The method of claim 2, wherein the target location corresponds to a centroid of the crowd-density map.

4. The method of claim 1, wherein generating the crowd-density map further comprises:
   detecting, via at least one machine learning algorithm, at least one physical feature of individual persons included in the image of the listening environment;
   determining a crowd density based, at least in part, on the physical features of the individual persons; and
   generating the crowd-density map using the crowd density.

5. The method of claim 1, wherein the at least one audio parameter comprises at least one of phase or power of the at least one audio output signal.

6. The method of claim 1, further comprising dynamically modifying the at least one audio parameter in response to a change in the crowd-density map.

7. The method of claim 2, wherein determining the target location in the listening environment further comprises converting pixel locations in the crowd-density map to a real-world coordinate system based, at least in part, on physical dimensions of the listening environment.

8. A system comprising:
   a memory storing an application; and
   a processor that is coupled to the memory and, when executing the application, is configured to:
      receive an image of a listening environment;
      enhance the image of the listening environment based on a plurality of training images of the listening environment that includes a plurality of different lighting conditions to generate an enhanced image;
      generate a crowd-density map based, at least in part, on the enhanced image; and
      set at least one audio parameter associated with the system based, at least in part, on the crowd-density map,
   wherein:
      the processor is configured to enhance the image of the listening environment via a convolutional neural network,
      the convolutional neural network is trained with the plurality of training images, and
      the plurality of training images comprises (i) a first training image of the listening environment illuminated by a first level of light and (ii) a second training image of the listening environment illuminated by a second level of light greater than the first level of light.

9. The system of claim 8, wherein the processor is further configured to:
   determine a sweet spot location in the listening environment based, at least in part, on the crowd-density map;
   determine at least one value for the at least one audio parameter to configure the system to produce a sweet spot at the sweet spot location; and
   set the at least one audio parameter based, at least in part, on the at least one value.

10. The system of claim 8, wherein the processor is further configured to dynamically modify in real-time the at least one audio parameter in response to a change in the crowd-density map.

11. The system of claim 8, wherein the crowd-density map comprises a heat map.

12. A non-transitory computer-readable storage medium including instructions that, when executed by a processor, causes the processor to perform the steps of:
   receiving an image of a listening environment;
   enhancing the image of the listening environment based on a plurality of training images of the listening environment that includes a plurality of different lighting conditions to generate an enhanced image;
   generating a crowd-density map based, at least in part, on the enhanced image;
   determining a location of a centroid or other substantially central distribution of the crowd-density map, wherein the location is with respect to the listening environment; and
   determining at least one audio parameter based, at least in part, on the location;
   wherein:
      enhancing the image of the listening environment comprises enhancing the image of the listening environment via a convolutional neural network,
      the convolutional neural network is trained with the plurality of training images, and
      the plurality of training images comprises (i) a first training image of the listening environment illuminated by a first level of light and (ii) a second training image of the listening environment illuminated by a second level of light greater than the first level of light.

13. The non-transitory computer-readable storage medium of claim 12, wherein the instructions, when executed by the processor, further cause the processor to perform the step of transmitting the at least one audio parameter to an audio system.

14. The non-transitory computer-readable storage medium of claim 13, wherein the instructions, when executed by the processor, further cause the processor to perform the step of determining at least one value for the at least one audio parameter to configure the audio system to produce a sweet spot at the location.

15. The non-transitory computer-readable storage medium of claim 12, wherein the processor is further configured to dynamically modify in real-time the at least one audio parameter in response to a change in the crowd-density map.

16. The non-transitory computer-readable storage medium of claim 12, wherein the crowd-density map is generated via a neural network.

17. The non-transitory computer-readable storage medium of claim 16, wherein the neural network is trained based on a plurality of training images that includes a plurality of different listening environments, a plurality of different crowd densities, and a plurality of different lighting conditions.

* * * * *